US010775922B2

United States Patent
Hatano et al.

(10) Patent No.: US 10,775,922 B2
(45) Date of Patent: Sep. 15, 2020

(54) INPUT DEVICE HAVING LOAD CALCULATION METHOD FOR A PLURALITY OF PRESSED POSITIONS

(71) Applicant: ALPS ALPINE CO., LTD., Tokyo (JP)

(72) Inventors: Naoyuki Hatano, Miyagi (JP); Hiroshi Izumi, Miyagi (JP); Masafumi Takagi, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 16/256,053

(22) Filed: Jan. 24, 2019

(65) Prior Publication Data

US 2019/0155446 A1 May 23, 2019

Related U.S. Application Data

(63) Continuation of application No. PCT/JP2017/009551, filed on Mar. 9, 2017.

(30) Foreign Application Priority Data

Aug. 5, 2016 (JP) .................................. 2016-154840

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 2203/04104* (2013.01); *G06F 2203/04105* (2013.01)

(58) Field of Classification Search
CPC .................................................... G06F 3/0416

(Continued)

(56) References Cited

U.S. PATENT DOCUMENTS

2010/0229091 A1 9/2010 Homma et al.
2014/0062956 A1 3/2014 Ishizone et al.
(Continued)

FOREIGN PATENT DOCUMENTS

JP 2010-244252 10/2010
JP 2014-229029 12/2014
(Continued)

OTHER PUBLICATIONS

International Search Report dated Apr. 18, 2017 in PCT/JP2017/009551 filed on Mar. 9, 2017.

*Primary Examiner* — Long D Pham
(74) *Attorney, Agent, or Firm* — IPUSA, PLLC

(57) ABSTRACT

There is provision of an input device for calculating loads applied to multiple pressed points respectively, by executing one or more calculation loops in a load calculation unit. The calculation loop includes calculating computation values representing loads detected at load sensors based on initial pressed point loads, calculating a comparison value based on a comparison of the computation value with a detection value detected by the load sensor, calculating an adjustment value for adjusting the initial pressed point load based on the comparison values and pressed positions, and calculating the pressed point loads by adjusting the initial pressed point load based on the adjustment value. The load calculation unit uses the pressed point load calculated in the calculation loop for each of the pressed positions as an initial pressed point load in the next calculation loop.

10 Claims, 12 Drawing Sheets

(58) Field of Classification Search
USPC .......................................................... 345/174
See application file for complete search history.

(56) References Cited

U.S. PATENT DOCUMENTS

2015/0160751 A1    6/2015  Ishizone et al.
2016/0224086 A1*  8/2016  Kim ........................ G06F 3/044
2016/0378208 A1*  12/2016  Shahparnia ......... G06F 3/03545
                                                            345/173

FOREIGN PATENT DOCUMENTS

| WO | 2002/035461 | 5/2002 |
| WO | 2011/081882 | 7/2011 |
| WO | 2012/153555 | 11/2012 |
| WO | 2014/058005 | 4/2014 |

* cited by examiner

INPUT DEVICE HAVING LOAD CALCULATION METHOD FOR A PLURALITY OF PRESSED POSITIONS

CROSS-REFERENCE TO RELATED APPLICATIONS

This application is a continuation of International Application No. PCT/JP2017/009551 filed on Mar. 9, 2017 and designated the U.S., which claims priority to Japanese Patent Application No. 2016-154840 filed on Aug. 5, 2016. The contents of these applications are incorporated herein by reference in their entirety.

BACKGROUND OF THE INVENTION

1. Field of the Invention

The present disclosure relates to an input device and a load calculation method.

2. Description of the Related Art

Conventionally, there is known an input device having a touch panel sensor, multiple load detection sensors, and a control unit, as disclosed in Patent Document 1. The touch panel sensor is for detecting coordinates of a pressed point touched by a finger on an operation surface. The load detection sensors are provided on a back side of the touch panel sensor, and detect a load applied to a touch panel. The control unit detects a load applied to each pressed point.

The control unit in Patent Document 1 calculates coordinates (position coordinates) of each of the pressed points based on an output of the touch panel sensor, calculates barycentric coordinates of each of the pressed points and a barycentric load based on outputs of the load detection sensors, and calculates a load of each of the pressed points based on the position coordinates, the barycentric coordinates, and the barycentric load. Specifically, by multiplying a matrix A derived from the point coordinates and the barycentric load, by a matrix P consisting of the loads of the pressed points, a matrix M consisting of an x coordinate of the barycentric coordinates, a y coordinate of the barycentric coordinates, and the barycentric load, is obtained. The control unit in Patent Document 1 utilizes this calculation. That is, the control unit calculates the matrix P to be obtained by multiplying an inverse of the matrix A by the matrix M.

However, in the input device disclosed in Patent Document 1, as a rule, accurate calculation is performed by calculating an inverse of a matrix A. Thus, if disturbance such as noise is applied, an incorrect solution may be obtained. For example, although a load must be a positive value, a load obtained by calculation may become negative, and thereby which causes a problem that a position or movement of a finger may be erroneously detected. Further, in the input device disclosed in Patent Document 1, if an inverse of a matrix does not exist, such as a case in which three pressed points are on a straight line, because an inverse of a matrix is calculated by intentionally shifting a pressed point to be calculated, a problem occurs that a load cannot be calculated correctly. Further, in a case in which more than three pressed points are present, it takes extremely long to calculate an inverse of a matrix.

The present invention is made in light of the above problem, and aims at providing an input device, a load calculation method, and the like, which is capable of calculating a load of a pressed position accurately with small computational complexity.

PATENT DOCUMENT

[Patent Document 1] WO2012/153555

SUMMARY OF THE INVENTION

According to an aspect of the present disclosure, there is provision of an input device including an operation surface configured to be pressed by multiple operating bodies; a position sensor configured to detect pressed positions on the operation surface which are pressed by the multiple operating bodies; multiple load sensors each configured to detect a load applied to the operation surface from the multiple operating bodies at a different location, and to output a value representing the detected load as a detection value; and a load calculation unit configured to calculate pressed point loads representing loads applied to the pressed positions respectively, based on the pressed positions and the detection values, and to execute a calculation loop at least once in order to calculate the pressed point loads. The calculation loop includes calculating, by using initial pressed point loads corresponding to the respective pressed positions, a plurality of computation values representing loads to be detected at the respective load sensors, assuming that the initial pressed point loads are applied to the respective pressed positions in accordance with correspondence between the initial pressed point loads and the pressed positions; calculating, for each of the load sensors, a comparison value based on a comparison between the computation value and the detection value; calculating, for each of the pressed positions, an adjustment value used for adjusting the initial pressed point load, based on the comparison values and the pressed positions; and calculating, for each of the pressed positions, the pressed point load by adjusting the initial pressed point load based on the adjustment value. When the calculation loop is first executed, the load calculation unit is configured to use predetermined values as the initial pressed point loads.

DETAILED DESCRIPTION OF THE PREFERRED EMBODIMENTS

Overall Configuration of Input Device of First Embodiment

Figure 1:
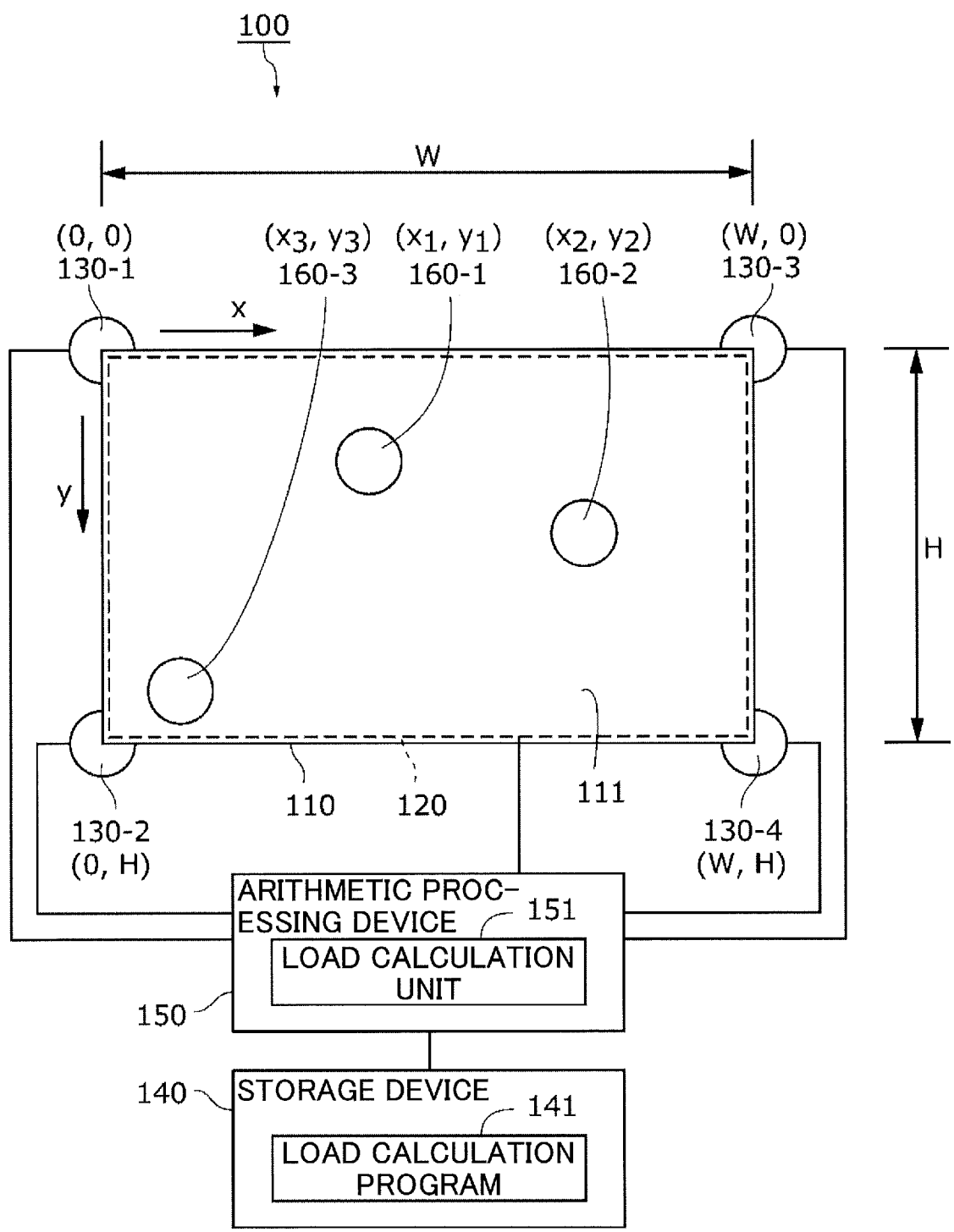
FIG. 1 is a diagram of an input device according to a first embodiment.

In the following, an input device according to a first embodiment of the present disclosure will be described. FIG. 1 is a schematic diagram of an input device 100 according to the present embodiment. The input device 100 is installed in an external device such as a personal computer, and detects positions touched by multiple operating bodies (such as fingers of a human or a stylus), and detects loads applied to the positions.

In the present specification, in order to express a direction, an x-direction and a y-direction which are orthogonal to each other are defined. However, because the above words are used for illustrating a relative positional relationship between each object, they do not necessarily express actual directions when the input device is actually used. Also, a shape of each element is not limited to the exact geometric form described in the specification, regardless of whether or not a word of "substantially" is attached to a word describing a shape of an element described in the specification, as long as a technical idea of the embodiment disclosed in the present specification can be realized.

As illustrated in FIG. 1, the input device 100 includes an operation panel 110 extending in parallel with an xy-plane, a position sensor 120 for detecting a position of operating bodies touching the operation panel 110, a first load sensor 130-1, a second load sensor 130-2, a third load sensor 130-3, a fourth load sensor 130-4 (hereinafter, each of them may be referred to as a "load sensor 130" without distinguishing them with each other), a storage device 140 (may also be referred to as a memory device), and an arithmetic processing device 150 (may also be referred to as a processor or a central processing unit (CPU)).

Operation Panel

The operation panel 110 includes an operation surface 111, and the operation panel 110 is a rectangular parallelepiped of a plate-like shape, having a slight thickness in a direction orthogonal to the xy-plane. When seen in the direction orthogonal to the xy-plane, a shape of the operation surface 111 is a rectangle having four edges along the x-direction and the y-direction. The operation surface 111 is a member pressed by multiple operating bodies, and shifts in the direction orthogonal to the xy-plane with little bending. In the following description, a width in the x-direction of the operation surface 111 is denoted as W (W=2432 in the present embodiment), and a width in the y-direction of the operation surface 111 is denoted as H (H=1280 in the present embodiment).

Position Sensor

The position sensor 120 is arranged in proximity to the operation panel 110 on a side opposite to the operation surface 111. The position sensor 120 detects pressed positions 160 pressed by operating bodies which presses the operation surface 111. The position sensor 120 detects the pressed positions 160 based on variation of capacitance of an area at which an electrode extending in the x-direction and an electrode extending in the y-direction intersect. The position sensor 120 may be another type of device detecting a pressed position by using a mechanism other than that described above.

For example, the position sensor 120 detects a first pressed position 160-1, a second pressed position 160-2, and a third pressed position 160-3 (each of which may be referred to as the "pressed position 160" when they are not distinguished) pressed by three respective operating bodies respectively. The number of the pressed positions 160 may be more than three, or may be less than three. The pressed position 160 is expressed as an x coordinate and a y coordinate.

Load Sensor

Each of the load sensors 130 is correlated with a corresponding point on the operation surface 111, and the load sensors 130 detect loads applied to the operation surface 111 by multiple operation bodies at their respective location. The load sensor 130 outputs a value corresponding to the detected load, as a detection value. Four points on the operation surface 111, which correspond to the respective four load sensors 130, are provided at respective vertexes of a rectangle having two edges extending in the x-direction and having two edges extending in the y-direction. That is, the four points are provided at four corners of the operation surface 111. The load sensor 130 is placed on the side of the operation panel 110 opposite to the operation surface 111, and detects a load in the direction orthogonal to the xy-plane. The load sensor 130 includes an elastic member (not illustrated in the drawings). When the operation surface 111 shifts in the direction orthogonal to the xy-plane by being pressed by an operating body, the elastic member deforms elastically. When the operating body leaves the operation surface 111, the operation panel 110 returns to an original position by elastic force of the elastic member.

The load sensor 130 detects a load based on a variation of a contacting area of conductive rubber deformed in accordance with a load with an electrode. The load sensors 130 may be another type of device detecting a load by using a mechanism other than that described above. The load sensor 130 does not necessarily detect a load of a pressed position 160 directly. When the operation panel 110 is pressed in the direction orthogonal to the xy-plane, the four load sensors 130 share a load applied to the operation panel 110, and each of the four load sensors 130 detects a shared load. In the present embodiment, the load sensor 130 detects a load that occurs when the operation panel 110 positioned at a regular position is pressed in one direction, and outputs the detected load as a positive detection value. In a case in which the load sensor 130 is working correctly, the detection value will not be negative.

Storage Device

The storage device 140 stores a load calculation program 141. The load calculation program 141 is read out by the arithmetic processing device 150, and causes the arithmetic processing device 150 to embody a function for performing a part of a load calculation method or to embody other functions. When the arithmetic processing device 150 performs various functions, the storage device 140 properly stores necessary information by control of the arithmetic processing device 150. The storage device 140 is a non-transitory tangible recording medium. The storage device 140 includes a read-only memory (ROM) or a random access memory (RAM). The storage device 140 is a volatile or nonvolatile recording medium. The storage device 140 may be removable, or may not be removable.

Arithmetic Processing Device

The arithmetic processing device 150 serves as a load calculation unit 151 by reading out the load calculation program 141 and executing the load calculation program 141. The arithmetic processing device 150 according to the present embodiment is a general-purpose computer. However, the arithmetic processing device 150 may be an application specific integrated circuit (ASIC), or may be another circuit capable of implementing functions to be described in the present embodiment.

Load Calculation Unit

Based on the multiple pressed positions 160 and the detection values, the load calculation unit 151 calculates loads applied to the respective pressed positions 160, by executing the load calculation method. In the present embodiment, a load applied to a pressed position 160 is referred to as a pressed point load.

Load Calculation Method

Figure 2:
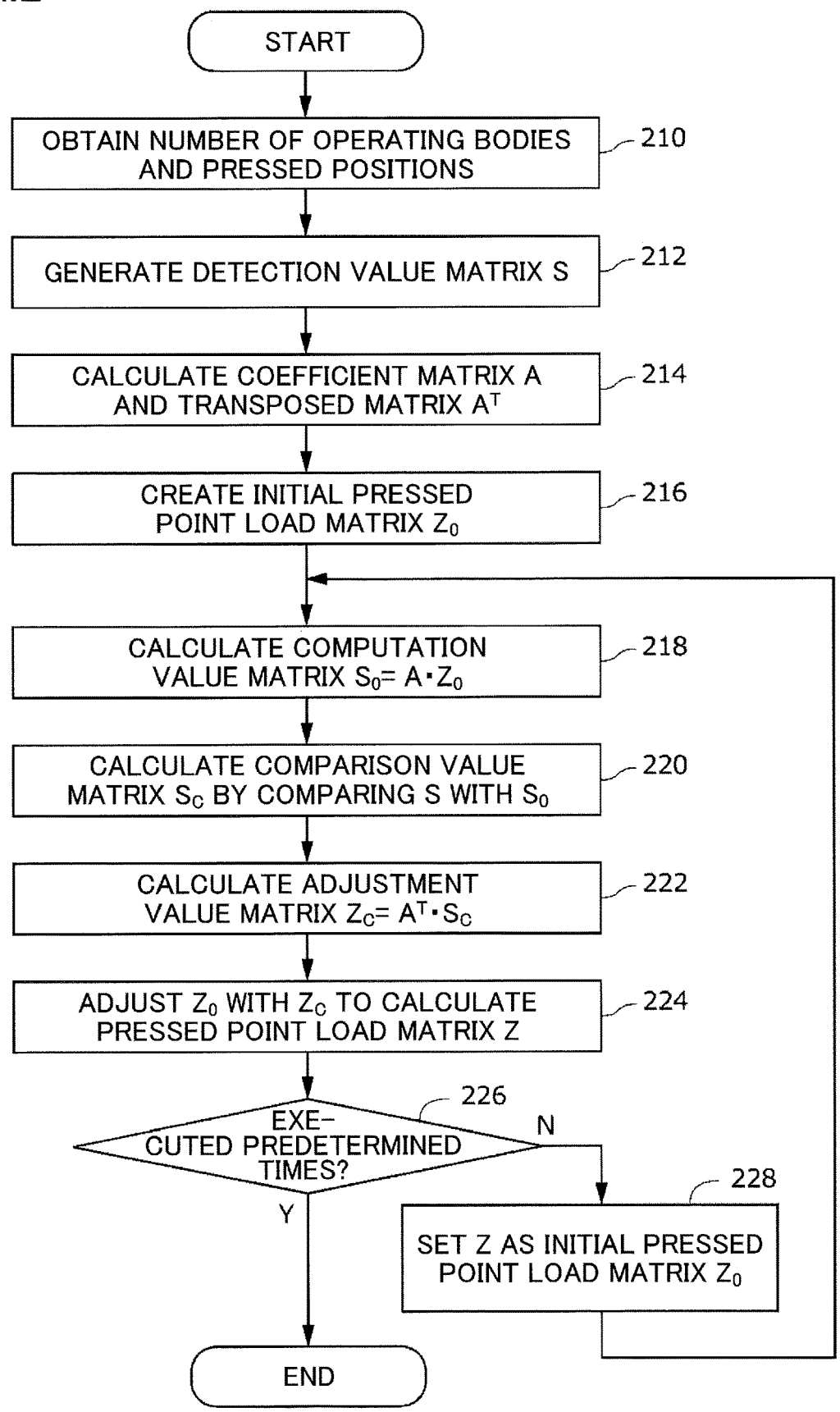
FIG. 2 is a flowchart illustrating a load calculation method.

FIG. 2 is a flowchart illustrating the load calculation method. In the following, the load calculation method performed by the load calculation unit 151 will be described with reference to the diagrams in FIG. 1 and the flowchart in FIG. 2. In the following, in addition to a general description, specific values relevant to each other will be presented as a first example. However, the present embodiment is not limited to the specific values to be presented below.

In the following description, when expressing a location of the operation surface 111, a format of (x coordinate, y coordinate) will be used. Coordinates of the first load sensor 130-1 are (0, 0). Coordinates of the second load sensor 130-2 are (0, H). Coordinates of the third load sensor 130-3 are (W, 0). Coordinates of the fourth load sensor 130-4 are (W, H). The number of the load sensors 130 is predetermined, and is expressed as m. In the first example, m is 4.

At step 210, the load calculation unit 151 acquires multiple pressed positions 160 using the position sensor 120, and acquires the number of the pressed positions 160 as the number of operating bodies. The pressed position 160 is acquired as coordinates in the operation surface 111. In the example of FIG. 1, let coordinates of the first pressed position 160-1 be $(x_1, y_1)$. Let coordinates of the second pressed position 160-2 be $(x_2, y_2)$. Let coordinates of the third pressed position 160-3 be $(x_3, y_3)$. The number of the pressed positions 160, that is, the number of operating bodies, is denoted as n.

In the first example, the number of the pressed positions 160 is 3. The coordinates of the first pressed position 160-1 are (1184, 353). The coordinates of the second pressed position 160-2 are (2033, 586). The coordinates of the third pressed position 160-3 are (409, 1148).

Subsequent to step 210, step 212 is performed. At step 212, the load calculation unit 151 generates a detection value matrix S with m rows and 1 column, consisting of the m number of detection values. The detection value matrix S is expressed as the following formula (1). Rows in the detection value matrix S correspond to the first load sensor 130-1, the second load sensor 130-2, the third load sensor 130-3, and the fourth load sensor 130-4, respectively from the uppermost row. Values stored in the formula (1) are values of the detection value matrix S in the first example.

$$S = \begin{pmatrix} 266 \\ 354 \\ 416 \\ 376 \end{pmatrix} \quad (1)$$

Subsequent to step 212, step 214 is performed. At step 214, the load calculation unit 151 calculates a coefficient matrix A with m rows and n columns, consisting of load distribution coefficients to be described below, and calculates a transposed matrix $A^T$ of the coefficient matrix A. The coefficient matrix A is, for example, expressed as the following formula (2).

$$A = \begin{pmatrix} \left(1-\frac{x_1}{W}\right)\left(1-\frac{y_1}{H}\right) & \left(1-\frac{x_2}{W}\right)\left(1-\frac{y_2}{H}\right) & \left(1-\frac{x_3}{W}\right)\left(1-\frac{y_3}{H}\right) \\ \left(1-\frac{x_1}{W}\right)\left(\frac{y_1}{H}\right) & \left(1-\frac{x_2}{W}\right)\left(\frac{y_2}{H}\right) & \left(1-\frac{x_3}{W}\right)\left(\frac{y_3}{H}\right) \\ \left(\frac{x_1}{W}\right)\left(1-\frac{y_1}{H}\right) & \left(\frac{x_2}{W}\right)\left(1-\frac{y_2}{H}\right) & \left(\frac{x_3}{W}\right)\left(1-\frac{y_3}{H}\right) \\ \left(\frac{x_1}{W}\right)\left(\frac{y_1}{H}\right) & \left(\frac{x_2}{W}\right)\left(\frac{y_2}{H}\right) & \left(\frac{x_3}{W}\right)\left(\frac{y_3}{H}\right) \end{pmatrix} \quad (2)$$

Rows in the coefficient matrix A correspond to the first load sensor 130-1, the second load sensor 130-2, the third load sensor 130-3, and the fourth load sensor 130-4, respectively from the uppermost row. Columns in the coefficient matrix A correspond to the first pressed position 160-1, the second pressed position 160-2, and the third pressed position 160-3, respectively from the leftmost column. That is, the (m×n) numbers of the load distribution coefficients each correspond to different sets of one of the multiple pressed positions 160 and one of the multiple load sensors 130.

For all integers k not less than 1 and not more than m, and for all integers p not less than 1 and not more than n, an entry in a k-th row and a p-th column of the coefficient matrix A (which is the load distribution coefficient) represents a ratio of a load detected by the load sensor 130 corresponding to the k-th row, to a pressed point load applied to the pressed position 160 corresponding to the p-th column. That is, each of the load distribution coefficients represents a ratio of a load detected by the load sensor 130 belonging to the corresponding set, to a pressed point load applied to the pressed position 160 belonging to the corresponding set.

The load distribution coefficient is calculated by multiplying a first value and a second value. The first value is obtained by dividing a value, obtained by subtracting a difference of an x coordinate of the load sensor 130 and an x coordinate of the pressed position 160 from a total width W of the operation surface 111 in the x-direction, by the total width W in the x-direction. The second value is obtained by dividing a value, obtained by subtracting a difference of a y coordinate of the load sensor 130 and a y coordinate of the pressed position 160 from a total width H of the operation surface 111 in the y-direction, by the total width H in the y-direction.

An example of the coefficient matrix A, in which values used in the first example are stored, is illustrated in the following formula (3).

$$A = \begin{pmatrix} 0.372 & 0.089 & 0.086 \\ 0.142 & 0.075 & 0.746 \\ 0.353 & 0.453 & 0.017 \\ 0.134 & 0.383 & 0.151 \end{pmatrix} \quad (3)$$

Subsequent to step 214, step 216 is performed. At step 216, the load calculation unit 151 creates an initial pressed point load matrix $Z_0$ with n rows and 1 column, consisting of an n number of initial pressed point loads to be described below. The initial pressed point load matrix $Z_0$ is expressed as the following formula (4). Rows in the initial pressed point load matrix $Z_0$ correspond to the first pressed position 160-1, the second pressed position 160-2, and the third pressed position 160-3, respectively from the uppermost row. In the formula (4), values used in the first example are stored.

$$Z_0 = \begin{pmatrix} 1.00 \\ 1.00 \\ 1.00 \end{pmatrix} \quad (4)$$

The initial pressed point load represents a load that is tentatively assigned to each of the pressed positions 160, as a pressed point load before executing a calculation loop to be described below. When executing the calculation loop for the first time, the load calculation unit 151 uses predetermined values as the initial pressed point loads corresponding to the respective pressed positions 160. The predetermined values are positive values. In the first example, all the predetermined values are "1".

Subsequent to step 216, step 218 is performed. Steps 218 to 224 to be described below are referred to as the calculation loop. The load calculation unit 151 calculates the multiple pressed point loads by executing the calculation loop at least once. The load calculation unit 151 may execute the calculation loop multiple times.

At step 218, the load calculation unit 151 calculates multiple computation values representing loads to be detected at the respective load sensors 130, assuming that loads corresponding to the respective initial pressed point loads are applied to the respective pressed positions 160 in accordance with a correspondence between the initial pressed point loads and the pressed positions 160. The calculating operation of the multiple computation values includes a calculating operation of calculating the multiple computation values based on the load distribution coefficients.

Specifically, the calculating operation of the multiple computation values includes an operation of calculating a computation value matrix $S_0(=A \cdot Z_0)$ with m rows and 1 column consisting of the m number of computation values. The computation value matrix $S_0$ is expressed as the following formula (5). Rows in the computation value matrix $S_0$ correspond to the first load sensor 130-1, the second load sensor 130-2, the third load sensor 130-3, and the fourth load sensor 130-4, respectively from the uppermost row. The formula (5) stores values in a case in which the formulas (3) and (4) are used.

$$S_0 = \begin{pmatrix} 0.372 & 0.089 & 0.086 \\ 0.142 & 0.075 & 0.746 \\ 0.353 & 0.453 & 0.017 \\ 0.134 & 0.383 & 0.151 \end{pmatrix} \cdot \begin{pmatrix} 1.00 \\ 1.00 \\ 1.00 \end{pmatrix} = \begin{pmatrix} 0.546 \\ 0.963 \\ 0.823 \\ 0.668 \end{pmatrix} \quad (5)$$

Subsequent to step 218, step 220 is performed. At step 220, for each of the load sensors 130, the load calculation unit 151 calculates a comparison value based on a comparison between the computation value and the detection value. The operation of calculating the comparison value for each of the load sensors 130 includes an operation of dividing the detection value by the computation value, for each of the load sensors 130.

Specifically, the operation of calculating the comparison value for each of the load sensors 130 includes an operation of calculating a comparison value matrix $S_C$ with m rows and 1 column consisting of the m number of comparison values. The comparison value matrix $S_C$ is expressed as the following formula (6). Rows in the comparison value matrix $S_C$ correspond to the first load sensor 130-1, the second load sensor 130-2, the third load sensor 130-3, and the fourth load sensor 130-4, respectively from the uppermost row. The formula (6) stores values in a case in which the formulas (1) and (5) are used.

$$S_C = \begin{pmatrix} 266/0.546 \\ 354/0.963 \\ 416/0.823 \\ 376/0.668 \end{pmatrix} = \begin{pmatrix} 486.85 \\ 367.73 \\ 505.37 \\ 563.05 \end{pmatrix} \quad (6)$$

Subsequent to step 220, step 222 is performed. At step 222, for each of the pressed positions 160, the load calculation unit 151 calculates an adjustment value used for adjusting the initial pressed point load, based on the comparison values and the pressed positions 160. When a set of all load distribution coefficients corresponding to a certain pressed position 160 is referred to as a group of load distribution coefficients, the operation of calculating an adjustment value corresponding to the certain pressed position 160 includes an operation of calculating, for each of the load sensors 130, a product of a corresponding load distribution coefficient in the group of load distribution coefficients and a corresponding comparison value, and an operation of calculating a sum of each of the products as the adjustment value.

Specifically, the operation of calculating the adjustment value for each of the pressed positions 160 includes an operation of calculating an adjustment value matrix $Z_C$ ($=A^T \cdot S_C$) with n rows and 1 column consisting of the n number of adjustment values. The adjustment value matrix $Z_C$ is expressed as the following formula (7). Rows in the adjustment value matrix $Z_C$ correspond to the first pressed position 160-1, the second pressed position 160-2, and the third pressed position 160-3, respectively from the uppermost row. The formula (7) stores values in a case in which the formulas (3) and (6) are used.

$$Z_c = \begin{pmatrix} 0.372 & 0.142 & 0.353 & 0.134 \\ 0.089 & 0.075 & 0.453 & 0.383 \\ 0.086 & 0.746 & 0.017 & 0.151 \end{pmatrix} \cdot \begin{pmatrix} 486.85 \\ 367.73 \\ 505.37 \\ 563.05 \end{pmatrix} = \begin{pmatrix} 486.75 \\ 515.46 \\ 409.79 \end{pmatrix} \quad (7)$$

Subsequent to step 222, step 224 is performed. At step 224, for each of the pressed positions 160, the load calculation unit 151 calculates the pressed point load by adjusting the initial pressed point load based on the adjustment value. The operation of calculating the pressed point load for each of the pressed positions 160 includes an operation of calculating, for each of the pressed positions 160, the pressed point load by multiplying the adjustment value and the initial pressed point load.

Specifically, the operation of calculating the pressed point load for each of the pressed positions 160 by adjusting the initial pressed point load includes an operation of calculating a pressed point load matrix Z with n rows and 1 column consisting of the n number of pressed point loads. The pressed point load matrix Z is expressed as the following formula (8). Rows in the pressed point load matrix Z correspond to the first pressed position 160-1, the second pressed position 160-2, and the third pressed position 160-3, respectively from the uppermost row. In other words, the operation of calculating the pressed point load for each of the pressed positions 160 by adjusting the initial pressed point load includes an operation of obtaining an element of a p-th row of the pressed point load matrix Z by multiplying an element of the p-th row of the adjustment value matrix $Z_C$ by an element of the p-th row of the initial pressed point load matrix $Z_0$, for all integers of p not less than 1 and not more than n. The formula (8) stores values in a case in which the formulas (4) and (7) are used.

$$Z = \begin{pmatrix} 1.00 \times 486.75 \\ 1.00 \times 515.46 \\ 1.00 \times 409.79 \end{pmatrix} = \begin{pmatrix} 486.75 \\ 515.46 \\ 409.79 \end{pmatrix} \quad (8)$$

Subsequent to step 224, step 226 is performed. At step 226, the load calculation unit 151 determines whether the calculation loop has been executed for a predetermined number of times. An example of the predetermined number is 10. If the load calculation unit 151 determines that the calculation loop has been executed for the predetermined number of times, the load calculation method terminates. If the load calculation unit 151 determines that the calculation loop has not been executed for the predetermined number of times, a process of the load calculation method proceeds to step 228.

At step 228, for each of the pressed positions 160, the load calculation unit 151 determines to use the pressed point load calculated in the calculation loop as the initial pressed point load for the calculation loop to be executed next time. Specifically, when the load calculation unit 151 executes the calculation loop for the next iteration, the load calculation unit 151 uses the values in the formula (8) as the initial pressed point loads, instead of the values in the formula (4). After step 228, step 218 is executed again. When the calculation loop is executed multiple times, as the comparison value gradually converges to 1, it is found that the image data value is getting closer to an actual value.

In another embodiment, the load calculation unit 151 does not necessarily limit the number of executions of the calculation loop. Instead, the calculation loop may be repeated for a certain period of time. Alternatively, in another embodiment, instead of limiting the number of executions of the calculation loop, the load calculation unit 151 may repeat the execution of the calculation loop until a variation of the pressed point loads becomes smaller than a threshold.

With respect to the pressed point load matrix Z (formula (8)), the initial pressed point load matrix $Z_0$ (formula (4)), and the adjustment value matrix $Z_C$ (formula (7)), elements in the same row correspond to the same pressed position 160. With respect to the detection value matrix S (formula (1)), the computation value matrix $S_0$ (formula (5)), and the comparison value matrix $S_C$ (formula (6)), elements in the same row correspond to the same load sensor 130. With respect to the transposed matrix $A^T$ (formula (7)) and the pressed point load matrix Z (formula (8)), elements in the same row correspond to the same pressed position 160. With respect to the coefficient matrix A (formula (3)) and the detection value matrix S (formula (1)), elements in the same row correspond to the same load sensor 130.

Result of First Example of the First Embodiment

Figure 3:
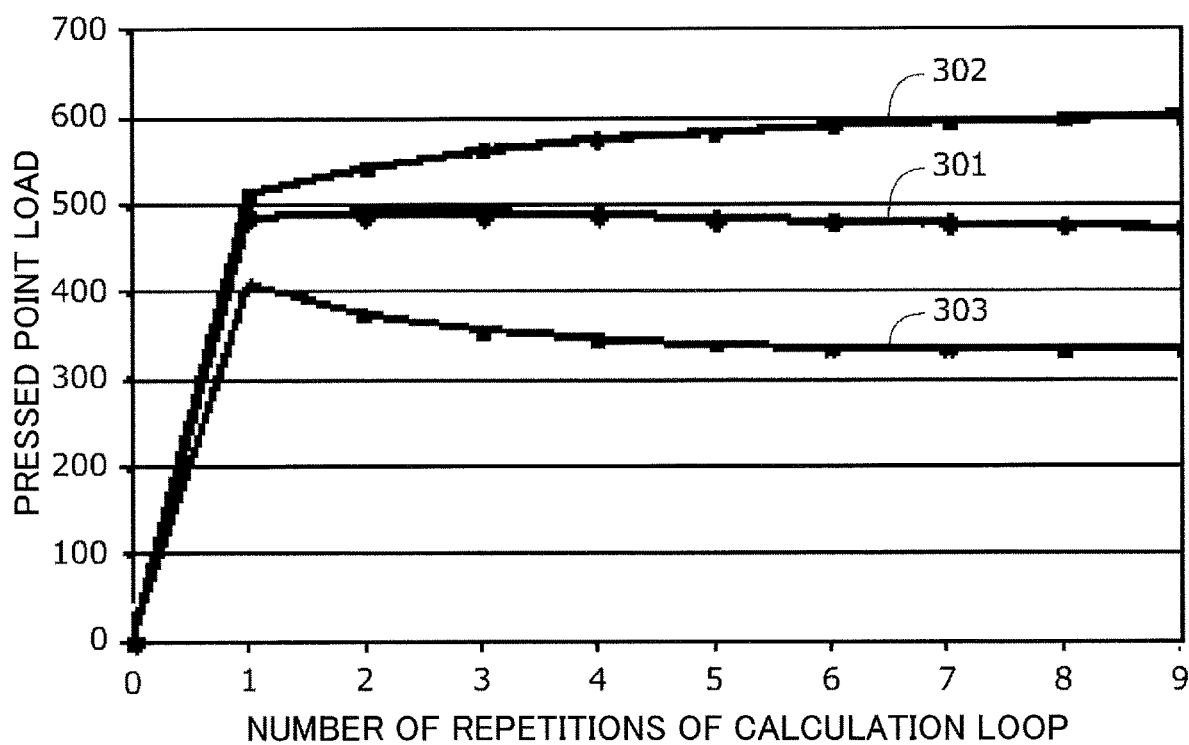
FIG. 3 is a graph illustrating a relationship between the number of repetitions of a calculation loop and a pressed point load in a first example of the first embodiment.

FIG. 3 is a graph illustrating a relationship between the number of repetitions of the calculation loop and the pressed point load. In executing the calculation loop, values described in the first example have been used. A curve 301 represents a variation of the pressed point load of the first pressed position 160-1 in accordance with the number of repetitions of the calculation loop. A curve 302 represents a variation of the pressed point load of the second pressed position 160-2 in accordance with the number of repetitions of the calculation loop. A curve 303 represents a variation of the pressed point load of the third pressed position 160-3 in accordance with the number of repetitions of the calculation loop. As illustrated in the curves 301, 302, and 303, a pressed point load close to a converged value can be obtained by a single execution of the calculation loop, and the pressed point load gradually converges without changing excessively.

Second Example of the First Embodiment

Figure 4:
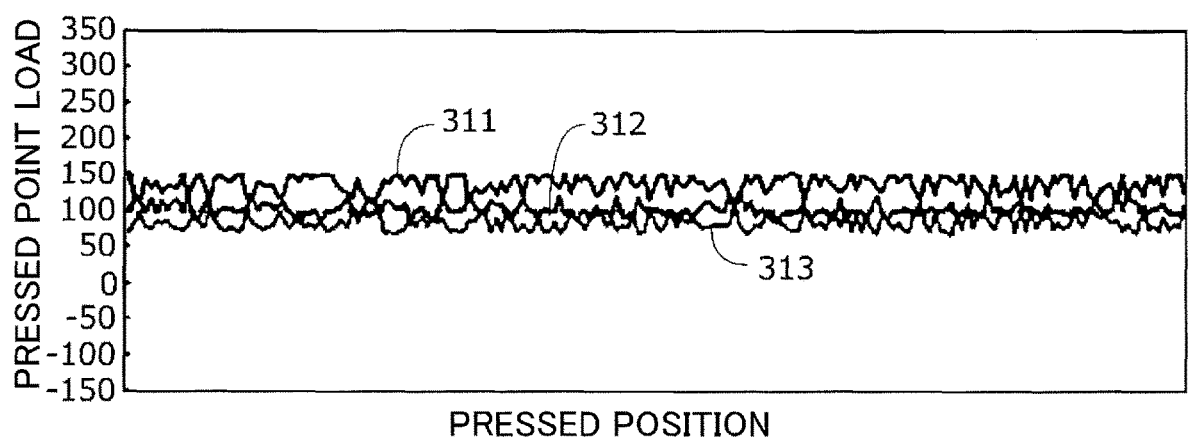
FIG. 4 is a graph illustrating a relationship between a variation of a pressed position and a pressed point load in a case not affected by noise, in a second example of the first embodiment.
Figure 5:
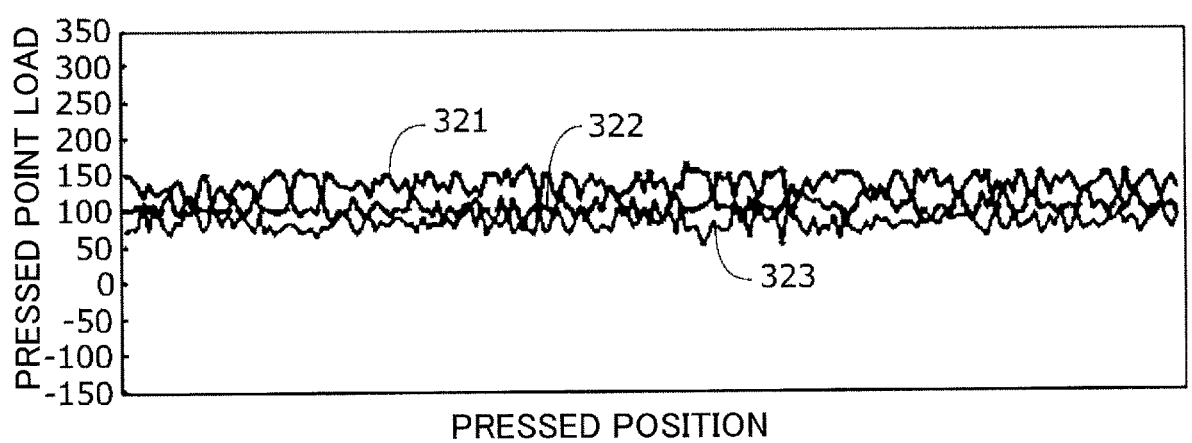
FIG. 5 is a graph illustrating a relationship between a variation of a pressed position and a pressed point load in a case affected by noise, in the second example of the first embodiment.
Figure 6:
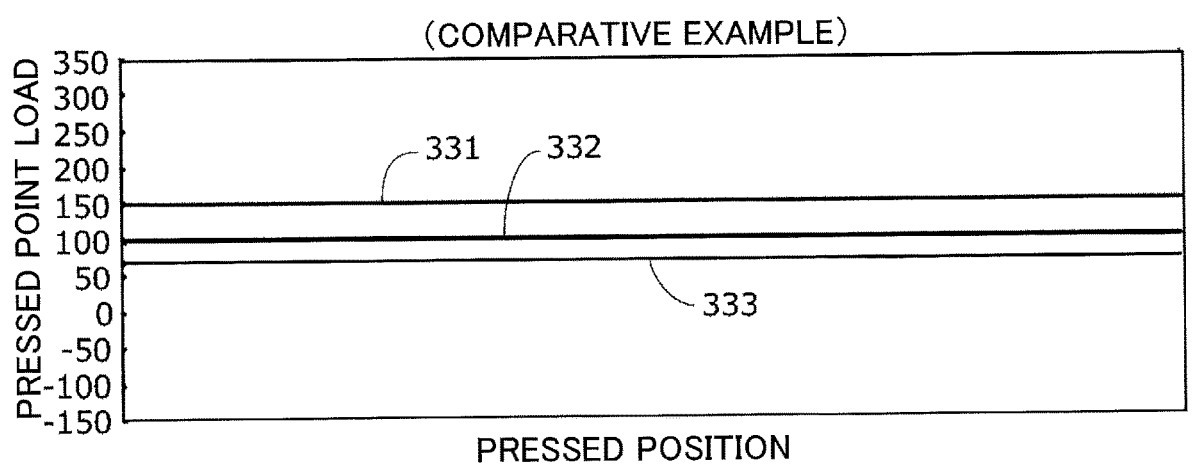
FIG. 6 is a graph illustrating a relationship between a variation of a pressed position and a pressed point load in a case not affected by noise, in the comparative example.
Figure 7:
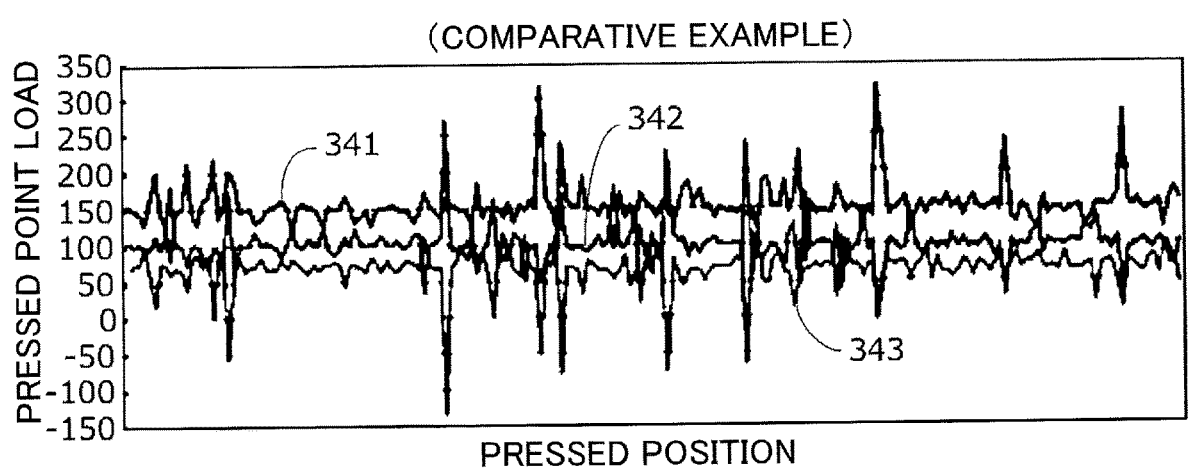
FIG. 7 is a graph illustrating a relationship between a variation of a pressed position and a pressed point load in a case affected by noise, in the comparative example.

FIGS. 4 to 7 are graphs illustrating a relationship between variations of positions of three operating bodies and pressed point loads of the three operating bodies. A horizontal axis represents a pressed position (that is, different locations on a horizontal axis respectively represent different pressed positions). A vertical axis represents a pressed point load. Although loads applied by the three operating bodies are different from each other, a load applied by each of the three operating bodies is constant regardless of a location of the corresponding operating body. Graphs according to the second example of the present embodiment are illustrated in FIGS. 4 and 5. In FIGS. 6 and 7, graphs according to a comparative example are illustrated. In the comparative example, by using a pseudoinverse of the coefficient matrix A (which is either exactly an inverse of the coefficient matrix A, or a generalized inverse capable of obtaining the pressed point loads by multiplying by the coefficient matrix), the pressed point loads are accurately calculated. In the following description, noise means a fluctuation of a detection value of the load sensor 130 or the position sensor 120. Examples of noise include strong electromagnetic field noise, static electricity, and stress applied independently of an operation. Noise also occurs because of variation of temperature, humidity, or voltage.

FIG. 4 represents a case not affected by noise in the second example of the present embodiment. Curves 311, 312, and 313 correspond to different operating bodies respectively. FIG. 5 represents a case affected by noise of 20 dB, in the second example of the present embodiment. Curves 321, 322, and 323 correspond to different operating bodies respectively. As is apparent from FIGS. 4 and 5, in the present embodiment, effect of noise to a calculated pressed point load is hardly seen even when noise is applied.

FIG. 6 represents a case in the comparative example not affected by noise. Curves 331, 332, and 333 correspond to different operating bodies respectively. In the comparative example, fluctuation of a calculated pressed point load was little when not affected by noise. FIG. 7 according to the comparative example represents a case affected by noise of 20 dB. Curves 341, 342, and 343 correspond to different operating bodies respectively. In the comparative example, fluctuation of a calculated pressed point load has become extremely large when affected by noise.

Third Example of the First Embodiment

Figure 8:
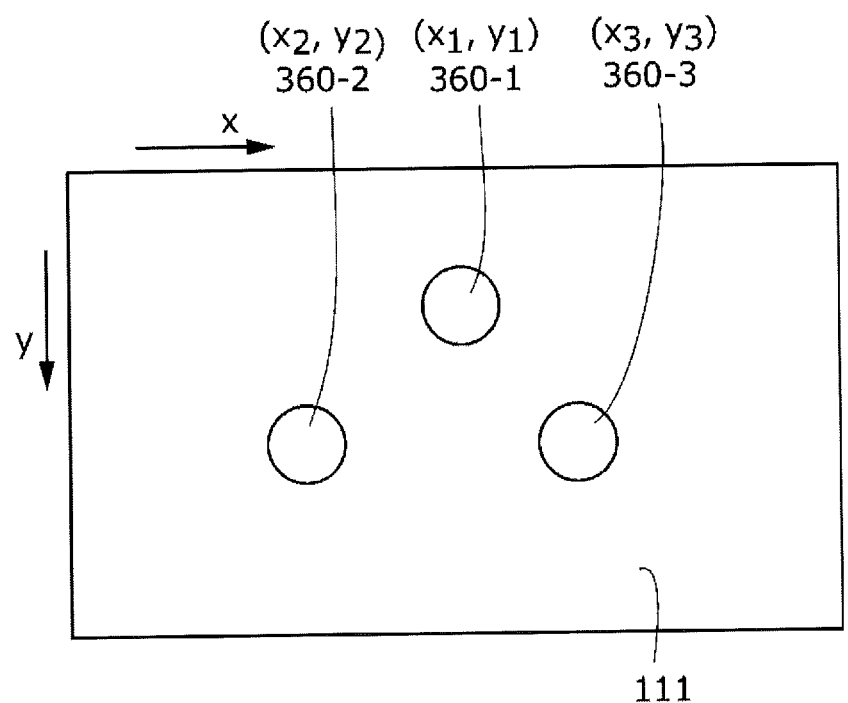
FIG. 8 is a diagram illustrating pressed positions in a third and fourth examples of the first embodiment.

Next, a third example of the first embodiment will be described. FIG. 8 is a diagram illustrating pressed positions pressed by operating bodies in the third example. The number of the pressed positions in the third example was three. Coordinates of a first pressed position 360-1 were (1200, 300). Coordinates of a second pressed position 360-2 were (700, 700). Coordinates of a third pressed position 360-3 were (1600, 700).

In the third example, the detection value matrix S as described in the following formula (9) has been obtained. Rows in the detection value matrix S correspond to the first load sensor 130-1, the second load sensor 130-2, the third load sensor 130-3, and the fourth load sensor 130-4, respectively from the uppermost row. The coefficient matrix A has been obtained by performing the calculation described above.

$$S = \begin{pmatrix} 100 \\ 100 \\ 100 \\ 100 \end{pmatrix} \quad (9)$$

Similar to a conventional method, when a calculation of $Z=A^{-1} \cdot S$ has been performed by using an inverse of the coefficient matrix A, the pressed point load matrix Z described in the following formula (10) has been obtained. Rows in the pressed point load matrix Z correspond to the first pressed position 360-1, the second pressed position 360-2, and the third pressed position 360-3, respectively from the uppermost row. If a calculation of $S=A \cdot Z$ is performed for verification, the formula (9) is naturally obtained. That is, accuracy of the calculation result is high. However, the conventional method requires extremely high computational complexity because an inverse of the coefficient matrix A needs to be calculated.

$$Z = \begin{pmatrix} 60 \\ 144 \\ 196 \end{pmatrix} \quad (10)$$

When the calculation loop according to the present embodiment has been executed multiple times, the pressed point load matrix Z described in the following formula (11) has been obtained. Rows in the pressed point load matrix Z correspond to the first pressed position 360-1, the second pressed position 360-2, and the third pressed position 360-3, respectively from the uppermost row.

$$Z = \begin{pmatrix} 69 \\ 141 \\ 190 \end{pmatrix} \quad (11)$$

When a calculation of $S=A \cdot Z$ was performed for verification by using the formula (11), the following formula (12) was obtained. Although the formula (12) contains a little error, as compared with the formula (9), a result of the formula (12) is close to the formula (9). Thus, it is found that accuracy of the formula (11) is high.

$$S = \begin{pmatrix} 102 \\ 99 \\ 101 \\ 99 \end{pmatrix} \quad (12)$$

Fourth Example of the First Embodiment

Next, a fourth example of the first embodiment will be described. Pressed positions and the number of the pressed positions in the fourth example are the same as those of the third example. The fourth example corresponds to a case in which a detection value matrix S similar to the third example has been obtained but the detection value matrix S in the fourth example contains noise of 10%.

In the fourth example, the detection value matrix S as described in the following formula (13) has been obtained. Rows in the detection value matrix S correspond to the first load sensor 130-1, the second load sensor 130-2, the third load sensor 130-3, and the fourth load sensor 130-4, respectively from the uppermost row. As compared with the detection value matrix S in the third example described in the formula (9), in each entry of the detection value matrix S in the fourth example, a deviation of 10% has been observed. The coefficient matrix A has been obtained by performing the calculation described above.

$$S = \begin{pmatrix} 90 \\ 110 \\ 90 \\ 110 \end{pmatrix} \quad (13)$$

Similar to a conventional method, when a calculation of $Z=A^{-1} \cdot S$ has been performed by using an inverse of the coefficient matrix A, the pressed point load matrix Z described in the following formula (14) has been obtained. Rows in the pressed point load matrix Z correspond to the first pressed position 360-1, the second pressed position 360-2, and the third pressed position 360-3, respectively from the uppermost row. If a calculation of $S=A \cdot Z$ is performed for verification, the formula (13) is naturally obtained. That is, it is sure that the formula (14) is a solution.

However, the formula (14) deviates from the pressed point load matrix Z obtained when no noise occurs (that is, the formula (10) in the third example). Also, because a negative value is included in an entry of the pressed point load matrix Z in the formula (14), it is found that a result of the calculation is abnormal. That is, in the conventional method, noise largely affects the result of the calculation.

$$Z = \begin{pmatrix} -4 \\ 172 \\ 232 \end{pmatrix} \quad (14)$$

When the calculation loop according to the present embodiment has been executed multiple times, the pressed point load matrix Z described in the following formula (15) has been obtained. Rows in the pressed point load matrix Z correspond to the first pressed position 360-1, the second pressed position 360-2, and the third pressed position 360-3, respectively from the uppermost row. As compared with the result obtained by the conventional method, the pressed point load matrix Z in the formula (15) is close to the pressed point load matrix Z obtained when no noise occurs (that is, the formula (10) in the third example). Further, because all elements in the formula (15) are positive, it is found that a result of the calculation is normal.

$$Z = \begin{pmatrix} 28 \\ 159 \\ 213 \end{pmatrix} \quad (15)$$

When a calculation of S=A·Z was performed for verification by using the formula (15), the following formula (16) was obtained. Although the formula (16) contains a little error, as compared with the formula (13), a result of the formula (16) is close to the formula (13) and it is found that accuracy of the formula (15) is high. That is, the load calculation method according to the present embodiment is less likely to be affected by noise, as compared with the conventional method.

$$S = \begin{pmatrix} 95 \\ 105 \\ 95 \\ 105 \end{pmatrix} \quad (16)$$

Fifth Example of the First Embodiment

Figure 9:
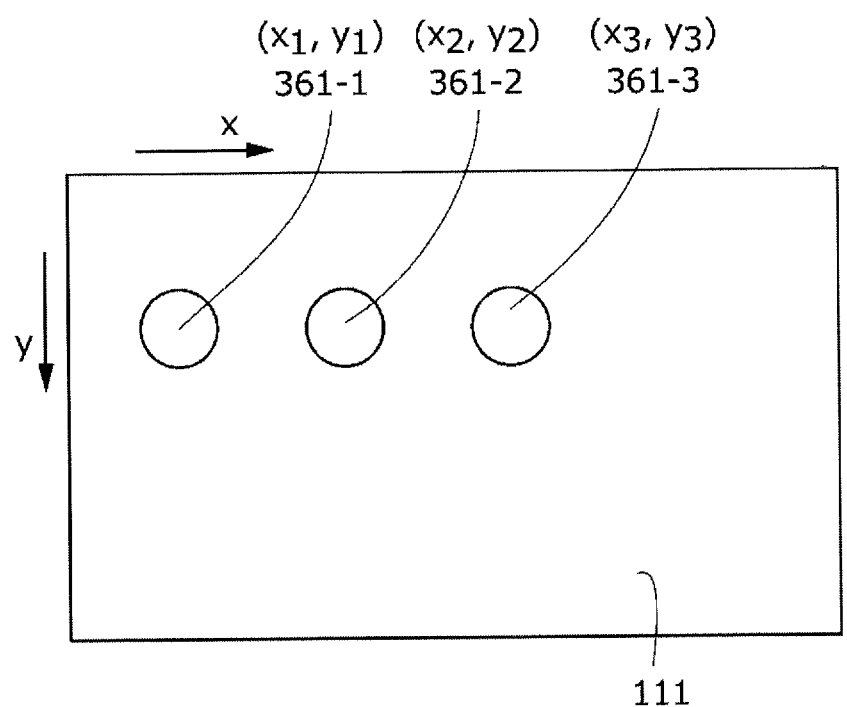
FIG. 9 is a diagram illustrating pressed positions in a fifth example of the first embodiment.

Next, a fifth example of the first embodiment will be described. FIG. 9 is a diagram illustrating pressed positions pressed by operating bodies in the fifth example. The number of the pressed positions in the fifth example was three. Coordinates of a first pressed position 361-1 were (300, 300). Coordinates of a second pressed position 361-2 were (800, 300). Coordinates of a third pressed position 361-3 were (1300, 300). That is, all the pressed positions were arranged on a straight line.

In the fifth example, the detection value matrix S as described in the following formula (17) has been obtained. Rows in the detection value matrix S correspond to the first load sensor 130-1, the second load sensor 130-2, the third load sensor 130-3, and the fourth load sensor 130-4, respectively from the uppermost row. The coefficient matrix A has been obtained by performing the calculation described above.

$$S = \begin{pmatrix} 100 \\ 100 \\ 100 \\ 100 \end{pmatrix} \quad (17)$$

Similar to a conventional method, when a calculation of $Z=A^{-1} \cdot S$ has been performed by using an inverse of the coefficient matrix A, the pressed point load matrix Z described in the following formula (18) has been obtained. However, in this example (in a case in which all the pressed positions were arranged on a straight line), as an inverse of the coefficient matrix A does not exist, the coefficient matrix A has been manipulated so that an inverse can be calculated. Rows in the pressed point load matrix Z correspond to the first pressed position 361-1, the second pressed position 361-2, and the third pressed position 361-3, respectively from the uppermost row. Because a negative value is included in an entry of the pressed point load matrix Z in the formula (18), it is found that a result of the calculation is abnormal. That is, it means that manipulation of the coefficient matrix A largely affects the result of the calculation in the conventional method.

$$Z = \begin{pmatrix} 25 \\ -350 \\ 463 \end{pmatrix} \quad (18)$$

When performing a calculation of S=A·Z for verification, the following formula (19) was obtained. As the coefficient matrix A was manipulated to obtain an inverse, the formula (19) largely deviated from the formula (17). That is, it means that manipulation of the coefficient matrix A largely affects the result of the calculation, if the conventional method is used in a case in which all the pressed positions are arranged on a straight line.

$$S = \begin{pmatrix} 2 \\ 1 \\ 103 \\ 32 \end{pmatrix} \quad (19)$$

When the calculation loop according to the present embodiment has been executed multiple times, the pressed point load matrix Z described in the following formula (20) has been obtained. Rows in the pressed point load matrix Z correspond to the first pressed position 361-1, the second pressed position 361-2, and the third pressed position 361-3, respectively from the uppermost row. Because all elements in the formula (20) are positive, it is found that a result of the calculation is normal.

$$Z = \begin{pmatrix} 15 \\ 73 \\ 312 \end{pmatrix} \quad (20)$$

When a calculation of S=A·Z was performed for verification by using the formula (20), the following formula (21) was obtained. Although the formula (21) contains a little error, as compared with the formula (17), a result of the formula (21) is close to the formula (17). Thus, accuracy of the formula (20) is high. That is, according to the present embodiment, the pressed point load matrix Z can be calculated with high accuracy even if all pressed positions are arranged on a straight line. Further, because the present invention does not need to manipulate the coefficient matrix A in a case in which all the pressed positions are arranged on a straight line, a process for calculating the pressed point load matrix Z is simple.

$$S = \begin{pmatrix} 95 \\ 105 \\ 95 \\ 105 \end{pmatrix} \quad (21)$$

Summary

According to the present embodiment, by executing the calculation loop, the load calculation unit 151 calculates, for each of the load sensors 130, a comparison value based on a comparison between a computation value calculated from an initial pressed point load and a detection value, calculates an adjustment value based on the comparison value and a pressed position 160, and calculates a pressed point load by adjusting the initial pressed point load using the adjustment value. Thus, as compared to a case in which initial pressed point loads are blindly selected, the load calculation unit 151 can cause the pressed point loads to converge toward actual values, with less computational complexity. That is, by starting approximate computation using initial pressed point loads tentatively determined, computational complexity of pressed point loads becomes less than performing exact calculation. Further, by considering a difference between a computation value and a detection value, a load of a pressed position 160 can be accurately calculated.

According to the present embodiment, because the computation value and the adjustment value are calculated based on load distribution coefficients, each of which represents a ratio of a load detected by a corresponding load sensor 130 to a pressed point load applied to a corresponding pressed position 160, pressed point loads can be accurately calculated by reflecting actual physical behavior of an operation surface.

According to the present embodiment, because the load distribution coefficients are calculated based on positions of the load sensors 130 and the pressed positions 160, pressed point loads can be accurately calculated by reflecting actual physical positional relation.

According to the present embodiment, because it is possible to perform approximate computation not using an inverse of a matrix, pressed point loads can be accurately calculated with less computational complexity as compared to a conventional method of performing exact calculation of an inverse of a matrix. Further, even in a case in which an inverse of a matrix cannot be calculated in the conventional method, such as in a case in which all the pressed positions are arranged on a straight line, pressed point loads can be accurately calculated in the method of the present embodiment because an inverse of a matrix is not required in the method of the present embodiment.

According to the present embodiment, when executing the calculation loop for the first time, predetermined positive values are used as initial pressed point loads corresponding to respective pressed positions 160. Thus, because solutions of pressed point loads always become positive if detection values are positive, a case in which apparently incorrect solutions (such as a solution indicating that a negative pressure is applied to an operation surface) are obtained can be avoided.

According to the present embodiment, because execution of the calculation loop is repeated multiple times, initial pressed point loads can be made to converge toward actual values gradually, and pressed point loads can be more accurately calculated.

Load Calculation Method According to Second Embodiment

Figure 10:
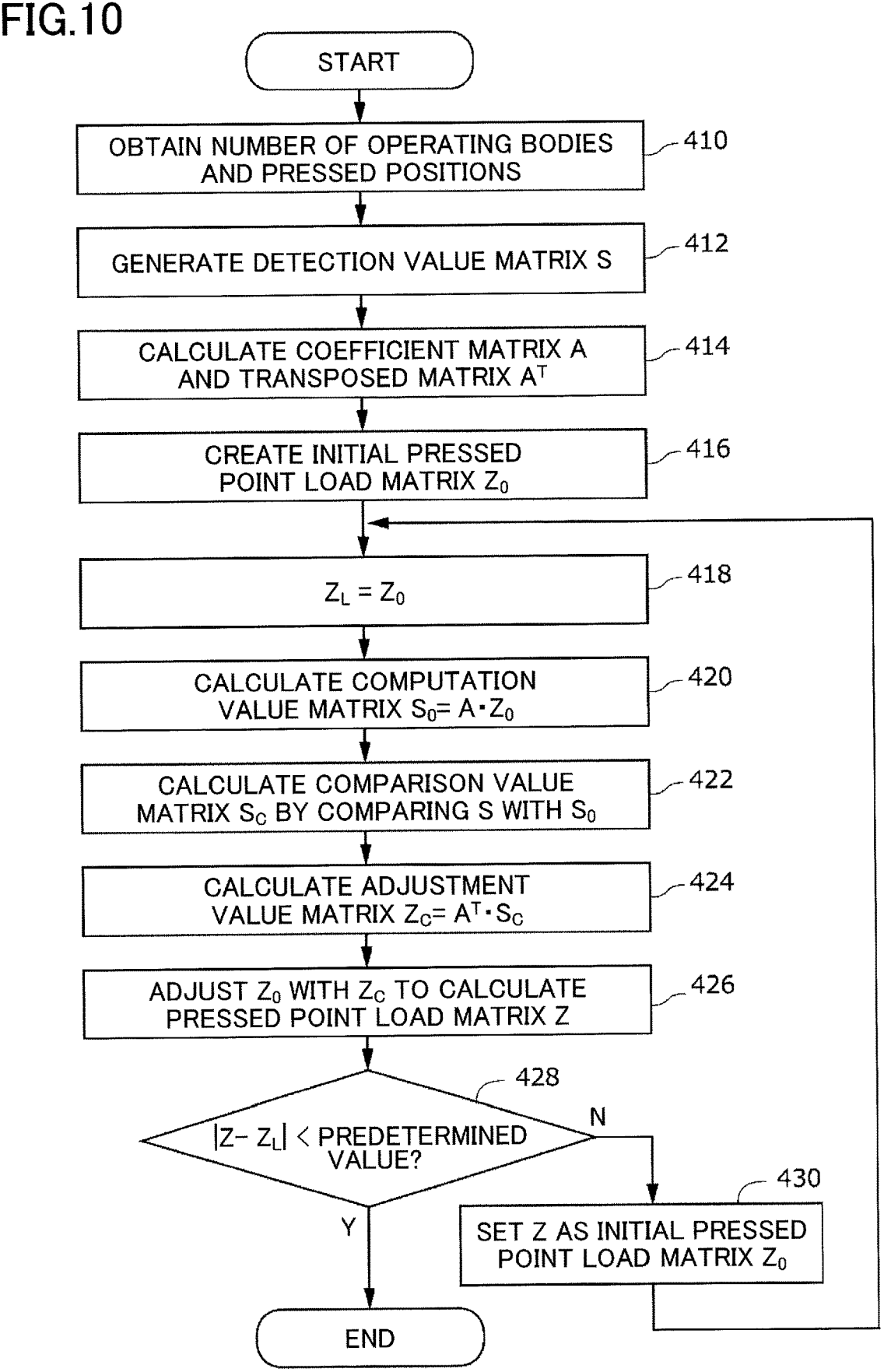
FIG. 10 is a flowchart illustrating a load calculation method according to a second embodiment.

FIG. 10 is a flowchart illustrating a load calculation method according to a second embodiment. In the following, the load calculation method according to the second embodiment performed by the load calculation unit 151 will be described with reference to the diagrams in FIG. 1 and the flowchart in FIG. 10. In the following, difference between the load calculation method of the first embodiment and the load calculation method of the second embodiment will be mainly described.

As steps 410 to 416 in FIG. 10 are the same as steps 210 to 216 in FIG. 2 respectively, descriptions of these steps are omitted.

Subsequent to step 416, step 418 is performed. In the present embodiment, steps 418 to 426 to be described below are referred to as a calculation loop. The load calculation unit 151 calculates the multiple pressed point loads by performing the calculation loop at least once. The load calculation unit 151 may perform the calculation loop multiple times.

At step 418, the load calculation unit 151 creates a last pressed point load matrix $Z_L$ with n rows and 1 column, consisting of an n number of the initial pressed point loads. At this point (when step 418 has been executed for the first time), the last pressed point load matrix $Z_L$ is equal to the initial pressed point load matrix $Z_0$. Rows in the last pressed point load matrix $Z_L$ correspond to the first pressed position 160-1, the second pressed position 160-2, and the third pressed position 160-3, respectively from the uppermost row.

Subsequent to step 418, step 420 is performed. As steps 420 to 426 in FIG. 10 are the same as steps 218 to 224 in FIG. 2 respectively, descriptions of these steps are omitted.

Subsequent to step 426, step 428 is performed. At step 428, the load calculation unit 151 determines, for all integers of p not less than 1 and not more than n, whether or not an absolute value of a difference between an element of a p-th row of the last pressed point load matrix $Z_L$ an element of a p-th row of the pressed point load matrix Z is smaller than a predetermined value (in FIG. 10, the determination is depicted as "$|Z-Z_L|$<PREDETERMINED VALUE?"). If it is determined that all the absolute values are less than the predetermined value, the load calculation unit 151 terminates the load calculation method. If it is determined that any one of the absolute values is not less than the predetermined value, a process of the load calculation method proceeds to step 430. That is, when absolute values of differences between elements of the last pressed point load matrix $Z_L$ and corresponding elements of the pressed point load matrix Z becomes small, the load calculation unit 151 determines that the pressed point load matrix Z has converged and terminates the load calculation method.

As step 430 in FIG. 10 is the same as step 228 in FIG. 2, descriptions of step 430 is omitted. Subsequent to step 430, step 418 is performed again. That is, execution of the calculation loop is repeated.

Summary

According to the present embodiment, in response to an absolute value of a difference between an initial pressed point load before executing a calculation loop and a pressed point load calculated by the calculation loop becoming smaller than a predetermined value, repeated execution of the calculation loop terminates. Thus, as compared to a case in which determination is made in accordance with the number of repeated executions of the calculation loop, accuracy of a calculation result obtained finally can be equalized. Further, in a case in which determination is made in accordance with the number of repeated executions of the calculation loop, even if a calculation result of desired accuracy is obtained while repeating execution of the calculation loop, unnecessary calculation loops are repeated. In contrast, according to the present embodiment, a process can be terminated immediately at a time when a calculation result of desired accuracy is obtained.

Load Calculation Method according to Third Embodiment

Figure 11:
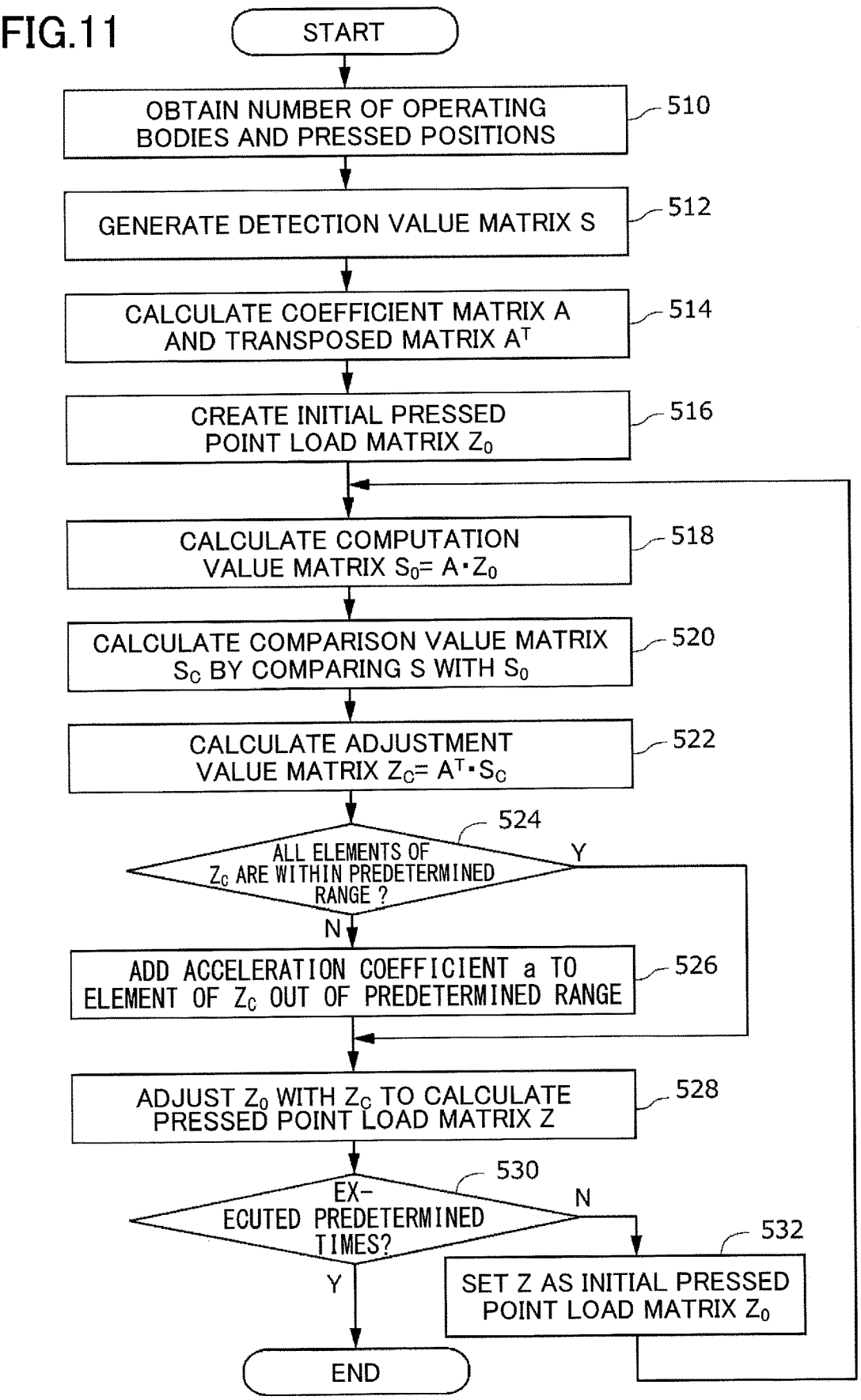
FIG. 11 is a flowchart illustrating a load calculation method according to a third embodiment.

FIG. 11 is a flowchart illustrating a load calculation method according to a third embodiment. In the following, the load calculation method according to the third embodiment performed by the load calculation unit 151 will be described with reference to the diagrams in FIG. 1 and the flowchart in FIG. 11. In the following, difference between the load calculation method of the first embodiment and the load calculation method of the third embodiment will be mainly described.

As will be described below, calculating a pressed point load for each pressed position includes a first operation performed in a case in which an absolute value of a difference between an adjustment value and 1 exceeds a predetermined value, and a second operation performed in a case in which an absolute value of a difference between the adjustment value and 1 is not larger than the predetermined value. In the first operation, the pressed point load is calculated by multiplying, by an initial pressed point load, an updated adjustment value obtained by adjusting the adjustment value so as to be closer to 1 by an adjustment coefficient less than the predetermined value. In the second operation, the pressed point load is calculated by multiplying the adjustment value by the initial pressed point load.

As steps 510 to 516 in FIG. 11 are the same as steps 210 to 216 in FIG. 2 respectively, descriptions of these steps are omitted.

Subsequent to step 516, step 518 is performed. In the present embodiment, steps 518 to 528 to be described below are referred to as a calculation loop. The load calculation unit 151 calculates the multiple pressed point loads by performing the calculation loop at least once. The load calculation unit 151 may perform the calculation loop multiple times.

Subsequent to step 516, step 518 is performed. As steps 518 to 522 in FIG. 11 are the same as steps 218 to 222 in FIG. 2 respectively, descriptions of these steps are omitted.

Subsequent to step 522, step 524 is performed. At step 524, the load calculation unit 151 determines whether all elements in the adjustment value matrix $Z_C$ are within a predetermined range or not. An example of the predetermined range is not smaller than 0.97 and not larger than 1.03. If it is determined that all the elements in the adjustment value matrix $Z_C$ are within the predetermined range, a process of the load calculation method proceeds to step 528. If it is determined that not all the elements in the adjustment value matrix $Z_C$ are within the predetermined range, the process of the load calculation method proceeds to step 526.

At step 526, the load calculation unit 151 adds an acceleration coefficient "a" to every element in the adjustment value matrix $Z_C$ that is out of the predetermined range (the predetermined range is the same as that used at step 524). For example, in a case in which the element is less than 0.97, the acceleration coefficient "a" is 0.025. In a case in which the element is larger than 1.03, the acceleration coefficient "a" is −0.025.

Subsequent to step 526, step 528 is performed. As steps 528 to 532 in FIG. 11 are the same as steps 224 to 228 in FIG. 2 respectively, descriptions of these steps are omitted. Subsequent to step 532, step 518 is performed again. That is, execution of the calculation loop is repeated.

Figure 12:
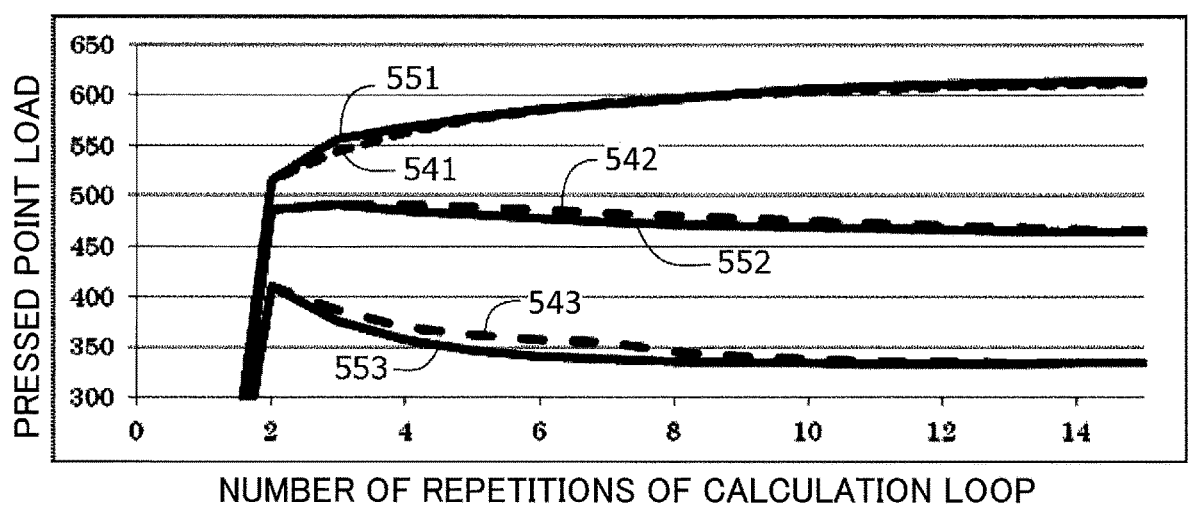
FIG. 12 is a graph illustrating a relationship between the number of repetitions of a calculation loop and a pressed point load in the third embodiment and the first embodiment.

FIG. 12 is a graph illustrating a relationship between the number of repetitions of the calculation loop and the pressed point load. Curves 541, 542, and 543 are results in a case in which an acceleration coefficient is not added (in a case in which the load calculation method of the first embodiment is used). Curves 551, 552, and 553 are results in a case in which the load calculation method of the third embodiment is used. Except for using an acceleration coefficient, conditions in FIG. 12 are the same as the first embodiment in FIG. 3. Curves 541 and 551 represent variations of the pressed point load of the first pressed position 160-1 in accordance with the number of repetitions of the calculation loop. Curves 542 and 552 represent variations of the pressed point load of the second pressed position 160-2 in accordance with the number of repetitions of the calculation loop. Curves 543 and 553 represent variations of the pressed point load of the third pressed position 160-3 in accordance with the number of repetitions of the calculation loop. The curves 551, 552, 553 have converged earlier than the curves 541, 542, and 543. That is, it is found that using an acceleration coefficient according to the present embodiment encourages convergence.

Summary

According to the present embodiment, in a case in which an adjustment value is not within a predetermined range from 1, the adjustment value is made to be closer to 1 by an amount of an adjustment coefficient. Thus, the present embodiment can encourage convergence of a pressed point load.

The present invention is not limited to the above described embodiments. That is, a person having ordinary skills in the art may perform various changes, combinations, sub-combinations, or alterations to the elements in the above described embodiment, within the scope of the present invention and equivalents thereof.

What is claimed is:

1. An input device comprising:
an operation surface configured to be pressed by a plurality of operating bodies;

a position sensor configured to detect pressed positions on the operation surface, each of the pressed positions being a position pressed by one of the plurality of operating bodies;

a plurality of load sensors each configured to detect, at a different location, a load applied to the operation surface from the plurality of operating bodies, the load sensors being configured to output values representing the detected loads as detection values; and a load calculation unit configured to calculate pressed point loads representing loads applied to the pressed positions respectively, based on the pressed positions and the detection values, the load calculation unit being configured to execute a calculation loop at least once in order to calculate the pressed point loads, the calculation loop including calculating, by using initial pressed point loads corresponding to the respective pressed positions, a plurality of computation values each representing a load to be detected at a corresponding load sensor of the load sensors, in a case of estimating that the initial pressed point loads are applied to the respective pressed positions in accordance with correspondence between the initial pressed point loads and the pressed positions;

calculating, for each of the load sensors, a comparison value based on a comparison between the computation value and the detection value;

calculating, for each of the pressed positions, an adjustment value used for adjusting the initial pressed point load, based on the comparison values and the pressed positions; and calculating, for each of the pressed positions, the pressed point load by adjusting the initial pressed point load based on the adjustment value;

wherein the load calculation unit is configured to use predetermined values as the initial pressed point loads when the calculation loop is first executed.

2. The input device according to claim 1, wherein
the calculating of the plurality of computation values includes calculating the plurality of computation values by using a plurality of load distribution coefficients, the plurality of load distribution coefficients respectively corresponding to different sets of one pressed position from among the pressed positions and one load sensor from among the plurality of load sensors, and each of the load distribution coefficients representing a ratio of a load detected by a load sensor belonging to a corresponding set of the different sets, to a pressed point load applied to a pressed position belonging to the corresponding set, the calculating of the comparison value for each of the load sensors includes, for each of the load sensors, dividing the detection value by the computation value, the calculating of the adjustment value corresponding to a given pressed position of the pressed positions includes, when all load distribution coefficients of the plurality of load distribution coefficients corresponding to the given pressed position are referred to as a group of load distribution coefficients, an operation of calculating, for each of the load sensors, a product of a corresponding load distribution coefficient in the group of load distribution coefficients and a corresponding comparison value, and an operation of calculating a sum of each of the products as the adjustment value, and the calculating of the pressed point load for each of the pressed positions includes calculating the pressed point load by multiplying, for each of the pressed positions, the adjustment value and the initial pressed point load.

3. The input device according to claim 2, wherein
the plurality of the load sensors being four load sensors;
the operation surface being a flat surface;
the four load sensors are associated with vertexes of a rectangle on the operation surface respectively, the rectangle having two edges of a first width extending in a first direction and having two edges of a second width extending in a second direction orthogonal to the first direction;

each of the four load sensors is configured to detect, as the detection value, a load applied to a vicinity of the associated vertex in a direction orthogonal to the operation surface; and in a case in which a location on the operation surface is expressed by a first coordinate in the first direction and a second coordinate in the second direction, the load distribution coefficient corresponding to a given set of the different sets are calculated by multiplying a first value and a second value, the first value being obtained by dividing, by the first width of the rectangle, a difference obtained by subtracting a difference of a first coordinate of a load sensor belonging to the given set and a first coordinate of a pressed position belonging to the given set from the first width of the rectangle, the second value being obtained by dividing, by the second width of the rectangle, a difference obtained by subtracting a difference of a second coordinate of the load sensor belonging to the given set and a second coordinate of the pressed position belonging to the given set from the second width of the rectangle.

4. The input device according to claim 2, wherein,
in a case in which
a number of the pressed positions is n,
n number of the pressed point loads are expressed as a matrix Z with n rows and 1 column,
n number of the initial pressed point loads are expressed as a matrix $Z_0$ with n rows and 1 column,
n number of the adjustment values are expressed as a matrix $Z_C$ with n rows and 1 column,
a number of the load sensors is m,
m number of the detection values are expressed as a matrix S with m rows and 1 column,
m number of the computation values are expressed as a matrix $S_0$ with m rows and 1 column,
m number of the comparison values are expressed as a matrix $S_C$ with m rows and 1 column,
each element of a same row in the matrix Z, the matrix $Z_0$, and the matrix $Z_C$ corresponds to a same pressed position from among the pressed positions, and
each element of a same row in the matrix S, the matrix $S_0$, and the matrix $S_C$ corresponds to a same load sensor from among the load sensors;
the load calculation unit is configured to calculate a coefficient matrix A with m rows and n columns consisting of the load distribution coefficients and to calculate a transposed matrix $A^T$ of the coefficient matrix A, each element of a same row in the coefficient matrix A and the matrix S corresponding to a same load sensor from among the load sensors, each element of a same row in the transposed matrix $A^T$ and the matrix Z corresponding to a same pressed position from among the pressed positions, and for all p and all k (p is an integer not smaller than 1 and not larger than n, and k is an integer not smaller than 1 and not larger than m), an entry in a k-th row and a p-th column of the coefficient matrix A representing a ratio of a load detected by the load sensor corresponding to the k-th row to a pressed point load applied to the pressed position corresponding to the p-th column;

the calculating of the plurality of computation values includes an operation of calculating $S_0 = A \cdot Z_0$;

the calculating of the comparison value for each of the load sensors includes an operation of, for all k not less than 1 and not more than m, obtaining an element of the k-th row of the matrix $S_C$ by dividing an element of the k-th row of the matrix S by an element of the k-th row of the matrix $S_0$;

the calculating of the adjustment value for each of the pressed positions includes an operation of calculating $Z_C = A^T \cdot S_C$; and the calculating of the pressed point load for each of the pressed positions by adjusting the initial pressed point load includes an operation of, for all p not less than 1 and not more than n, obtaining an element of the p-th row of the matrix Z by multiplying an element of the p-th row of the matrix $Z_0$ by an element of the p-th row of the matrix $Z_C$.

5. The input device according to claim 4, wherein the predetermined values used as the initial pressed point loads when the load calculation unit first executes the calculation loop are positive.

6. The input device according to claim 2, wherein the calculating of the pressed point load for each of the pressed positions includes a first operation performed in a case in which an absolute value of a difference between the adjustment value and 1 exceeds a predetermined value, and a second operation performed in a case in which an absolute value of a difference between the adjustment value and 1 is not larger than the predetermined value, the first operation including obtaining the pressed point load by multiplying, by the initial pressed point load, an updated adjustment value obtained by adjusting the adjustment value so as to be closer to 1 by an adjustment coefficient less than the predetermined value, the second operation including obtaining the pressed point load by multiplying the adjustment value by the initial pressed point load.

7. The input device according to claim 1, wherein the load calculation unit is configured to execute the calculation loop multiple times, and to use, for each of the pressed positions, the calculated pressed point loads as the initial pressed point loads for a next iteration of the load calculation unit executing the calculation loop.

8. The input device according to claim 1, wherein the load calculation unit is configured to terminate repeated execution of the calculation loop, in response to an absolute value of a difference between the initial pressed point load before executing the calculation loop and the pressed point load calculated by executing the calculation loop becoming smaller than a predetermined value.

9. A load calculation method performed in an input device including an operation surface configured to be pressed by a plurality of operating bodies, a position sensor configured to detect pressed positions on the operation surface, each of the pressed positions being a position pressed by one of the plurality of operating bodies, a plurality of load sensors each configured to detect, at a different location, a load applied to the operation surface from the plurality of operating bodies, the load sensors being configured to output values representing the detected loads as detection values, and a load calculation unit configured to calculate pressed point loads representing loads applied to the pressed positions respectively, based on the pressed positions and the detection values;

the method comprising executing, by the load calculation unit, a calculation loop at least once in order to calculate the pressed point loads, the calculation loop including calculating, by using initial pressed point loads corresponding to the respective pressed positions, a plurality of computation values each representing a load to be detected at a corresponding load sensor of the load sensors, in a case of estimating that the initial pressed point loads are applied to the respective pressed positions in accordance with correspondence between the initial pressed point loads and the pressed positions;

calculating, for each of the load sensors, a comparison value based on a comparison between the computation value and the detection value;

calculating, for each of the pressed positions, an adjustment value used for adjusting the initial pressed point load, based on the comparison values and the pressed positions; and calculating, for each of the pressed positions, the pressed point load by adjusting the initial pressed point load based on the adjustment value;

wherein, when the calculation loop is first executed, predetermined values are used as the initial pressed point loads.

10. A non-transitory computer-readable recording medium storing a computer program to cause a processor in a computer to execute the load calculation method according to claim 9.

* * * * *